(12) United States Patent (10) Patent No.: US 8,762,326 B1
Zhou et al. (45) Date of Patent: Jun. 24, 2014

(54) PERSONALIZED HOT TOPICS

(75) Inventors: Ye Zhou, Jersey City, NJ (US);
Vladislav Adzic, East Setauket, NY (US)

(73) Assignee: Google Inc., Mountain View, CA (US)

( * ) Notice: Subject to any disclaimer, the term of this patent is extended or adjusted under 35 U.S.C. 154(b) by 512 days.

(21) Appl. No.: 12/888,934

(22) Filed: Sep. 23, 2010

(51) Int. Cl.
*G06F 7/00* (2006.01)
*G06F 17/00* (2006.01)
*G06F 17/30* (2006.01)

(52) U.S. Cl.
CPC ................................. *G06F 17/30864* (2013.01)
USPC ............ 707/609; 707/687; 707/705; 707/899

(58) Field of Classification Search
CPC .................... G06F 17/30864; G06F 17/30663; G06F 17/30979
See application file for complete search history.

(56) References Cited

U.S. PATENT DOCUMENTS

| 6,801,909 | B2 * | 10/2004 | Delgado et al. ....................... 1/1 |
| 7,346,839 | B2 | 3/2008 | Acharya et al. |
| 8,037,097 | B2 * | 10/2011 | Guo et al. ...................... 707/792 |
| 8,041,652 | B2 * | 10/2011 | Barkai et al. ..................... 706/12 |
| 2007/0094247 | A1 * | 4/2007 | Chowdhury et al. ............. 707/4 |
| 2008/0082417 | A1 * | 4/2008 | Publicover ...................... 705/14 |
| 2008/0140650 | A1 * | 6/2008 | Stackpole ......................... 707/5 |
| 2009/0306959 | A1 * | 12/2009 | Rappoport et al. .............. 704/2 |

OTHER PUBLICATIONS

Google Inc., http://www.google.com/trends, 2008, 1 page.
Twitter Inc., http://search.twitter.com, Aug. 11, 2010, 1 page.

* cited by examiner

*Primary Examiner* — Susan Chen
(74) *Attorney, Agent, or Firm* — Harrity & Harrity, LLP

(57) ABSTRACT

A server device receives a user request and retrieves, based on the user request, a list of popular topics, a generic ranking score for each topic in the list of popular topics, and a topic profile for a first topic in the list of popular topics. The server device identifies a user profile for the user and determines a personalization score for the first topic in the list of popular topics, where the personalization score for the first topic is based on one or more similarities between the user profile and the topic profile for the first topic. The server device determines a revised ranking score for the first topic in the list of popular topics based on the personalization score and the generic ranking score for the first topic; and ranks the topics in the list of popular topics, using the revised ranking score for the first topic.

20 Claims, 9 Drawing Sheets

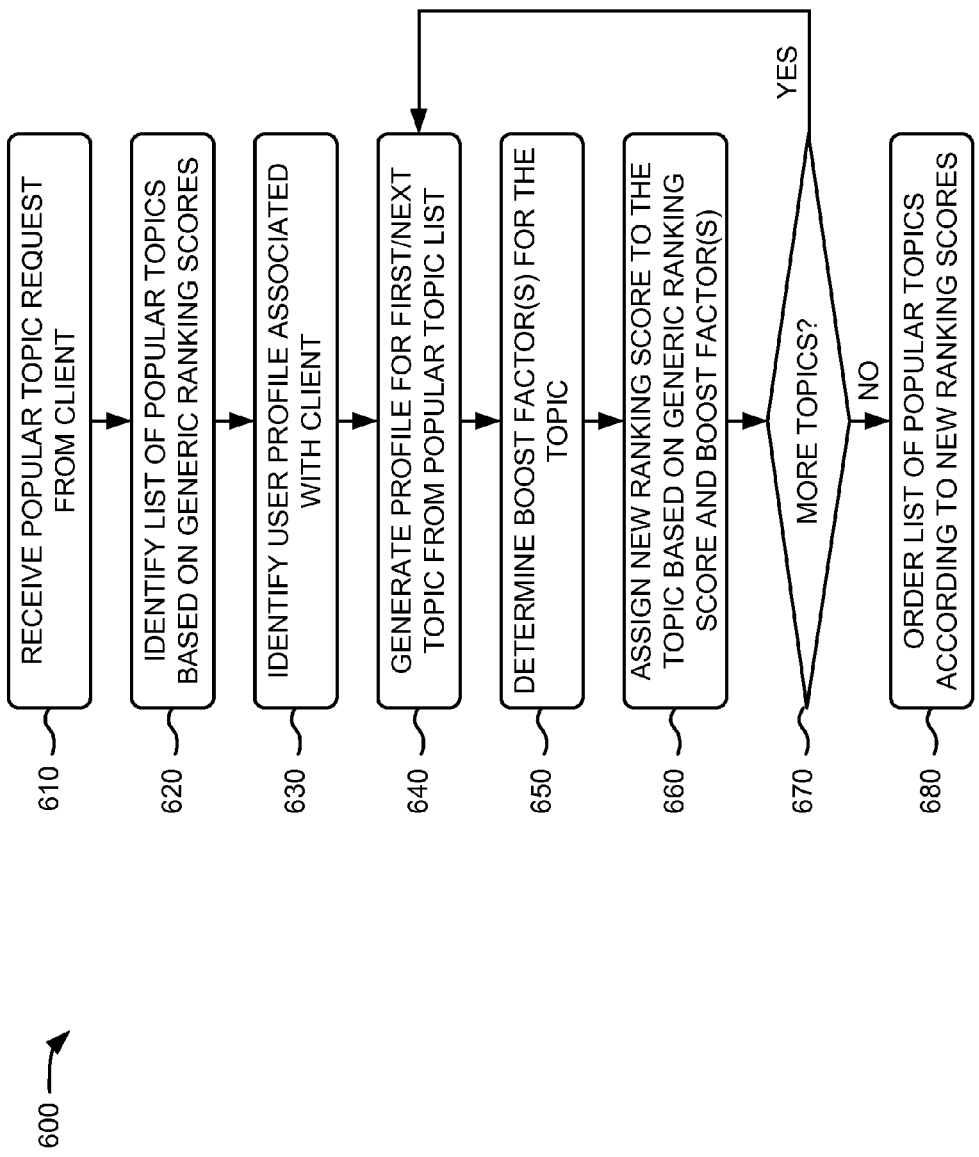

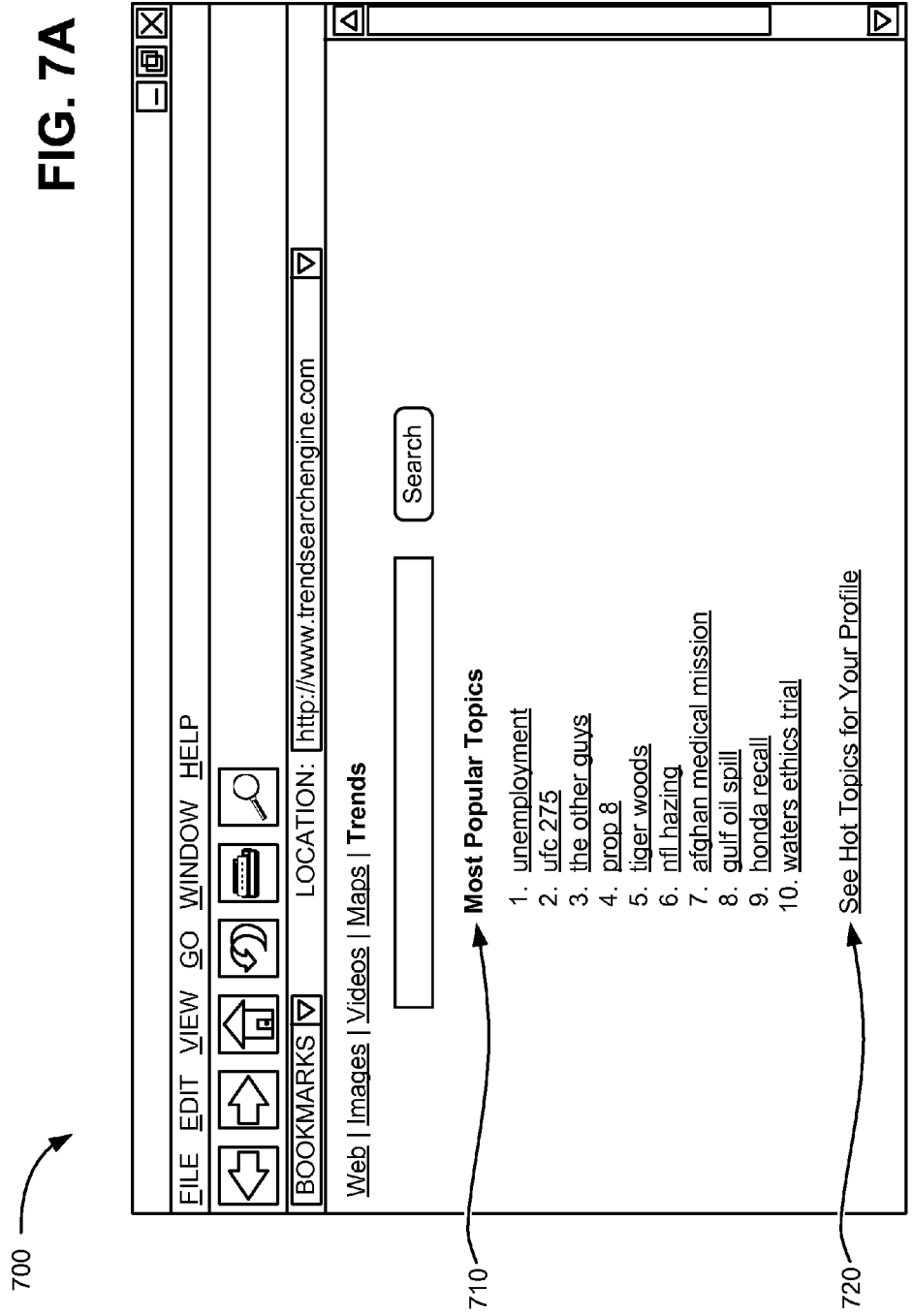

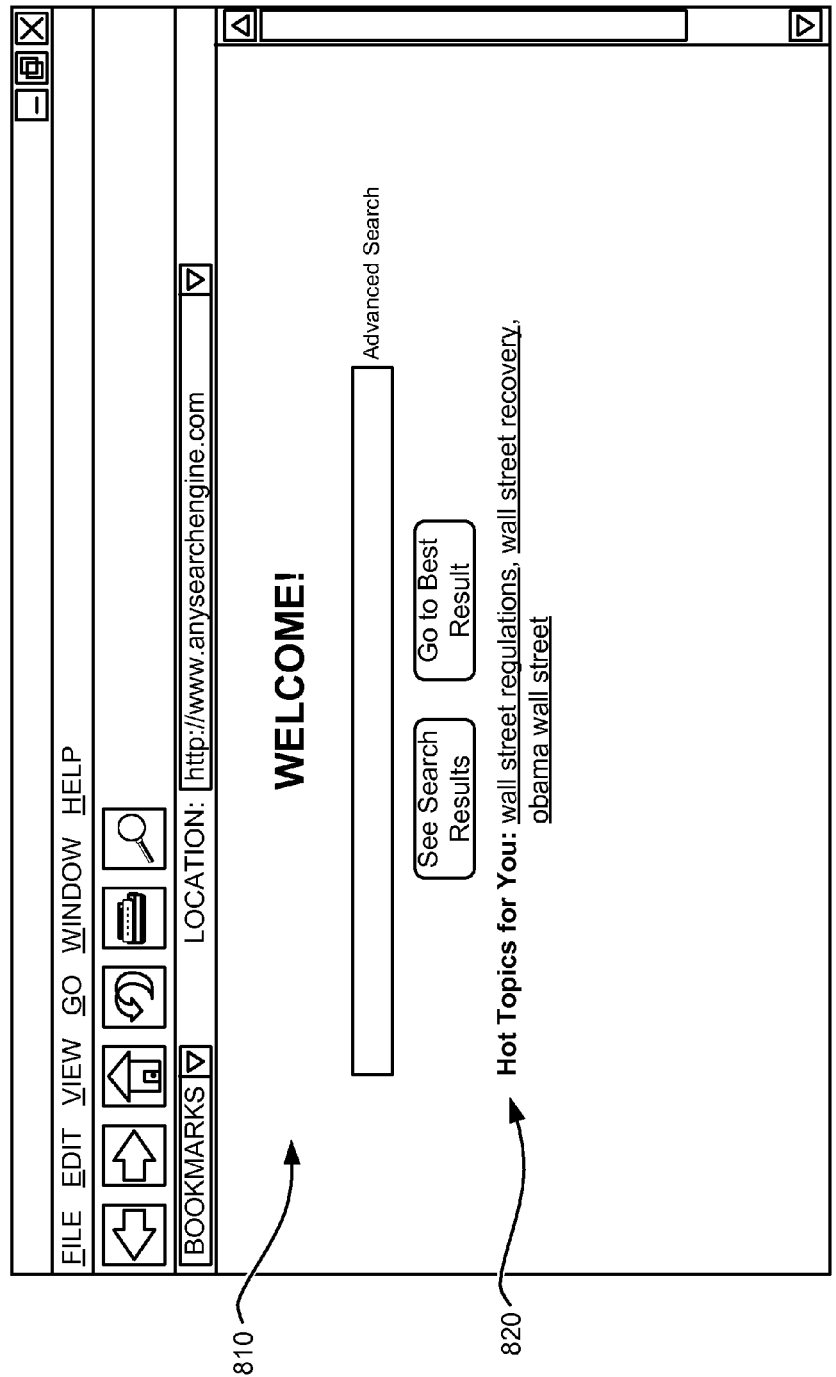

PERSONALIZED HOT TOPICS

BACKGROUND

Many techniques are available to users today to find information on the world wide web ("web"). For example, users often use web browsers and/or search engines to find information of interest. A user may enter a search query into a search box of a browser and the browser may submit the search query to a search engine. The search engine may identify documents that match the search query, rank the documents based on various factors, and return a ranked list of documents to the user. The user may select a document from the list and request the document. A browser may retrieve the requested document and display the document to the user in a browser window.

Some search engines offer statistics about fast rising topics (also referred to "popular topics" or "hot topics"), among users as a whole, as a tool to facilitate user information discovery. Many of these popular topics, however, will be of little interest to any one particular user.

SUMMARY

According to one aspect, a method, performed by one or more server devices, may include receiving, at a server, a user request; retrieving a list of popular topics, a generic ranking score for each topic in the list of popular topics, and a topic profile for a first topic in the list of popular topics; identifying a user profile for the user; determining a personalization score for the first topic in the list of popular topics, where the personalization score for the first topic is based on one or more similarities between the user profile and the topic profile for the first topic; determining a revised ranking score for the first topic in the list of popular topics based on the personalization score and the generic ranking score for the first topic; and ranking the topics in the list of popular topics, using the revised ranking score for the first topic.

According to another aspect, a server device may include a memory, to store a user profile database and a topic database, and a processor. The user profile database may include information about multiple users, and the topic database may include topics, where each topic is assigned a generic popularity score. The processor may execute instructions to receive a request from a client device associated with a user; retrieve, from the topic database, a list of generic popular topics for a particular time period, a generic ranking score for each topic in the list of generic popular topics, and a topic profile for a first topic in the list of generic popular topics; identify a user profile for the user; determine a personalization score for the first topic in the list of generic popular topics, where the personalization score for the first topic is based on one or more similarities between the user profile and the topic profile for the first topic; determine a revised ranking score for the first topic in the list of generic popular topics using the personalization score and the generic popularity score for the first topic; and rank the topics, in the list of generic popular topics, using the revised ranking score for the first topic.

According to yet another aspect, one or more memory devices, that include instructions executable by one or more processors, may include one or more instructions to retrieve a list of popular topics, a generic ranking score for each topic in the list of popular topics, and a topic profile for a first topic in the list of popular topics; one or more instructions to retrieve a user profile that includes categories of topics associated with a user; one or more instructions to determine a personalization score for the first topic in the list of popular topics, where the personalization score for the first topic is based on one or more similarities between the user profile and the topic profile for the first topic; one or more instructions to assign a revised ranking score for the first topic in the list of popular topics using the personalization score and the generic ranking score; and one or more instructions to rank the topics, in the list of popular topics, using the revised ranking score for the first topic.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 6 is a flowchart of an example process for providing personalized popular topics according to an implementation described herein;

FIGS. 7A and 7B provide an example of a user interface for presenting personalized popular topics according to an implementation described herein; and FIG. 8 provides another example of a user interface for presenting personalized popular topics according to an implementation described herein.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Overview

Figure 1:
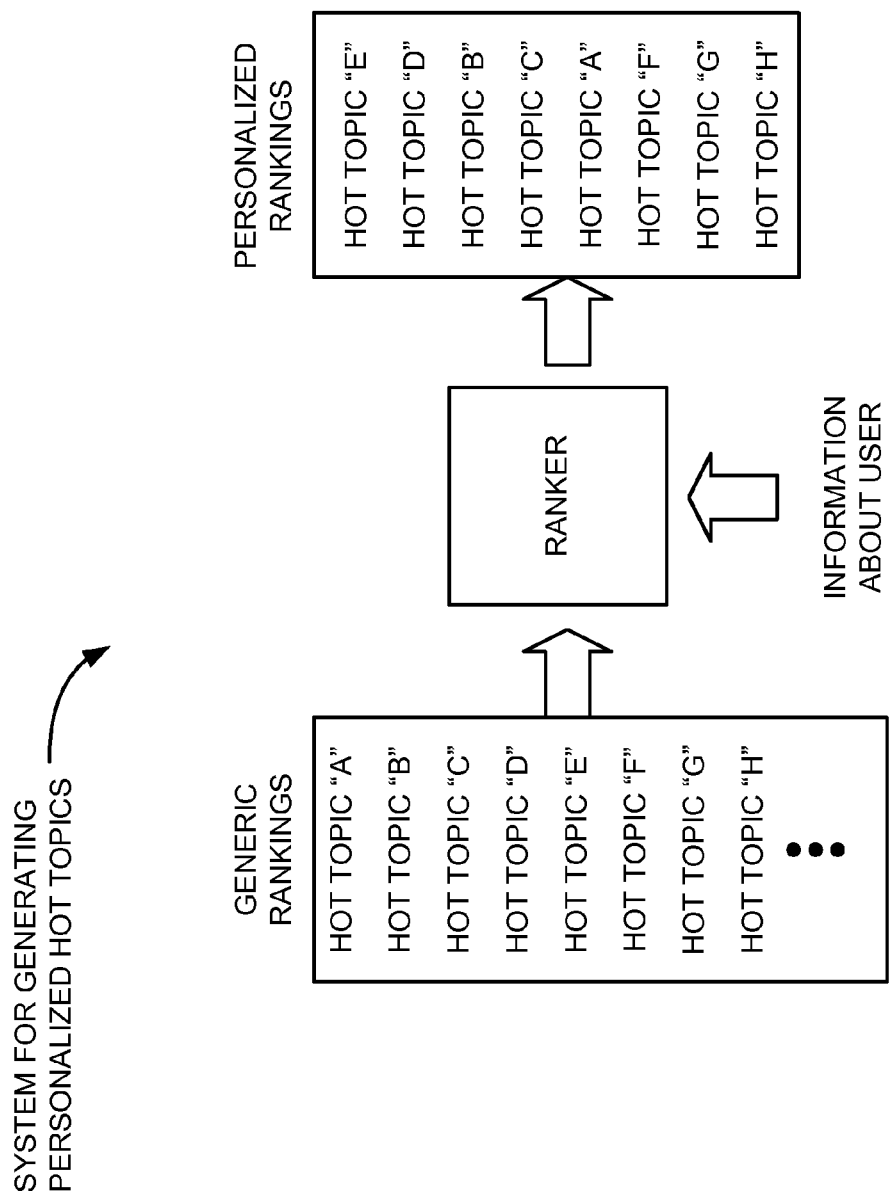
FIG. 1 is a diagram of an overview of an example implementation described herein.

Systems and/or methods described herein may relate to providing personalized rankings of popular topics for a search engine. For example, as shown in FIG. 1, a system for generating personalized popular topics may modify a generic ranking of popular topics to generate a personalized ranking of the popular topics. Generic rankings of popular topics (e.g., "Hot Topics A" through "Hot Topics H") may be assembled based on, for example, statistics from search histories of multiple users. A ranker may retrieve the list of generic popular topics, may identify categories associated with each topic, and may apply information about an individual user (e.g., a user that visits a particular web site, logs into a web site with a user account, submits a query to a search engine, etc.) to adjust the scores for each popular topic in the list of generic popular topics. The systems and/or methods may rank the popular topics, based on the adjusted scores, and provide the ranked popular topics to the user.

As used herein, the term "topic" may relate to a particular subject as derived, for example, from terms of a search query (e.g., provided by a user) and/or from a search result (e.g., provided by a server based on a search query). A "popular topic," as the term is used herein, may include topics that appear frequently, within a particular time period, based on users' activities (e.g., search queries, search results, blogs, posts, etc.) and/or independent of users' activities.

A "document," as the term is used herein, is to be broadly interpreted to include any machine-readable and machine-storable work product. A document may include, for example, an e-mail, a web page or a web site, a file, a combination of files, one or more files with embedded links to other files, a news group posting, a news article, a blog, a business listing, an electronic version of printed text, a web advertisement, etc. In the context of the web (i.e., the Internet), a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Example System

Figure 2:
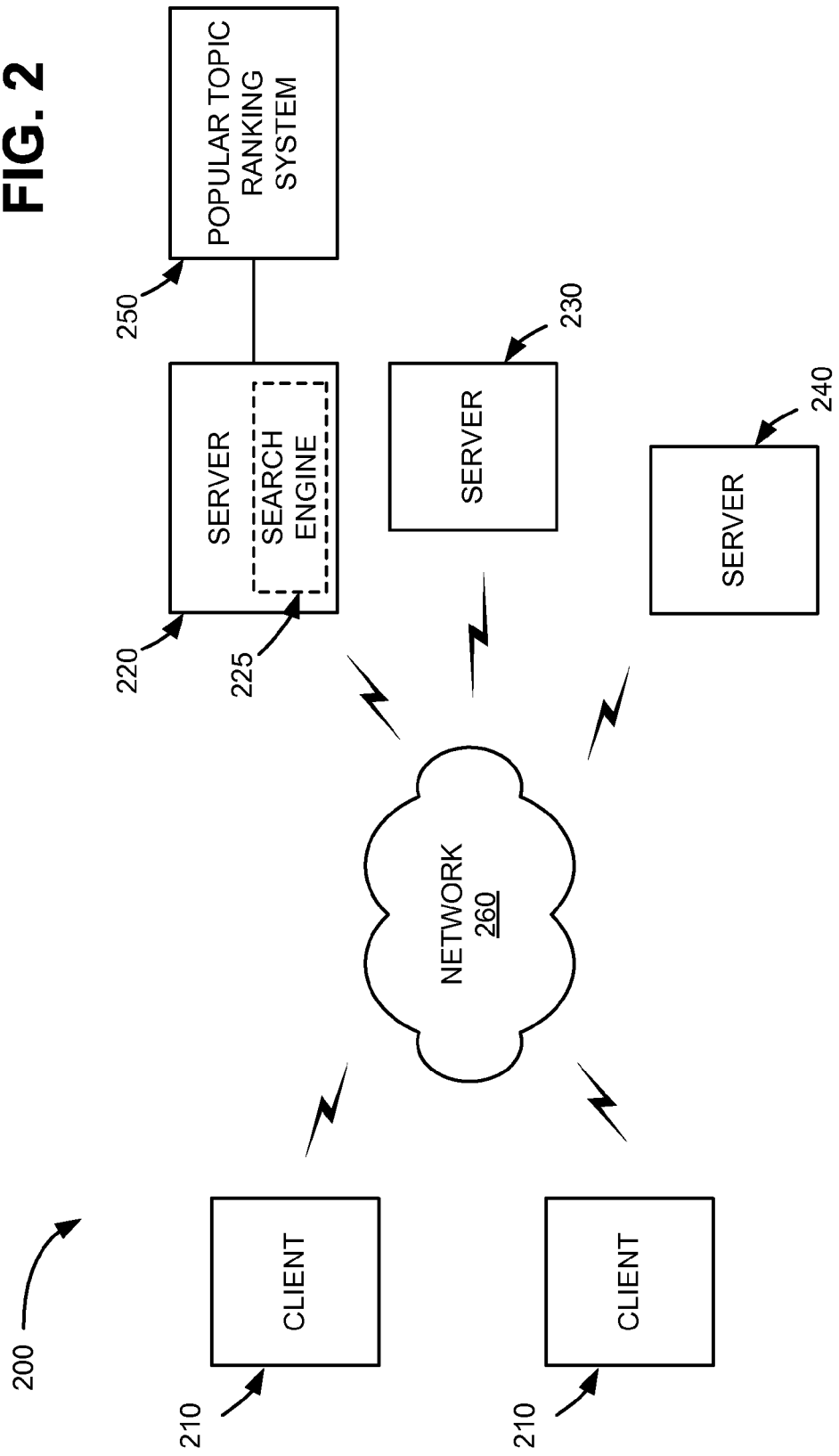
FIG. 2 is a diagram of an example network in which systems and methods described herein may be implemented.

FIG. 2 is an example diagram of a network 200 in which systems and methods described herein may be implemented. Network 200 may include multiple clients 210 connected to multiple servers 220-240 and a popular topic ranking system 250 (also referred to herein as "ranking system 250") via a network 260. Network 260 may include a local area network (LAN), a wide area network (WAN), a telephone network, such as the Public Switched Telephone Network (PSTN) or a cellular network, an intranet, the Internet, or a combination of networks. Two clients 210, three servers 220-240, and one popular topic ranking system 250 have been illustrated as connected to network 260 for simplicity. In practice, there may be more or fewer clients, servers, and ranking systems. Also, in some instances, a client may perform one or more functions of a server and/or a server may perform one or more functions of a client. For example, one or more functions of popular topic ranking system 250 described herein may be alternatively performed by a client 210.

Clients 210 may include client entities. An entity may be defined as a device, such as a personal computer, a wireless telephone, a personal digital assistant (PDA), a laptop, or another type of computation or communication device, a thread or process running on one of these devices; and/or an object executed by one of these devices. Servers 220-240 may include server entities that gather, process, search, and/or maintain documents. Clients 210 and servers 220-240 may connect to network 260 via wired and/or wireless connections.

Server 220 may include a search engine 225, useable by clients 210. Server 220 may crawl a corpus of documents (e.g., web pages), index the documents, and store information associated with the documents in a repository of crawled documents. In one implementation, server 220 may receive, from client 210, a user request for a list of popular topics. Server 220 may translate the user requests into internal requests that can be understood by ranking system 250. Servers 230 and 240 may store or maintain documents that may be crawled by server 220. While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Popular topic ranking system 250 may include one or more devices to receive user requests for lists of popular topics. Ranking system 250 may retrieve a list of generic popular topics, may identify categories associated with each topic, and may apply information about an individual user (e.g., a user associated with the user request), to adjust the scores for each popular topic in the list of generic popular topics. Ranking system 250 may rank the popular topics, based on the adjusted scores, and provide personalized ranked popular topics for presentation to the user. Ranking system is described further below in connection with, for example, FIG. 4.

Although FIG. 2 shows example components of network 200, in other implementations, network 200 may include fewer components, different components, additional components, or differently arranged components than depicted in FIG. 2. Additionally or alternatively, one or more components of network 200 may perform one or more tasks described as being performed by one or more other components of network 200.

Example Devices

Figure 3:
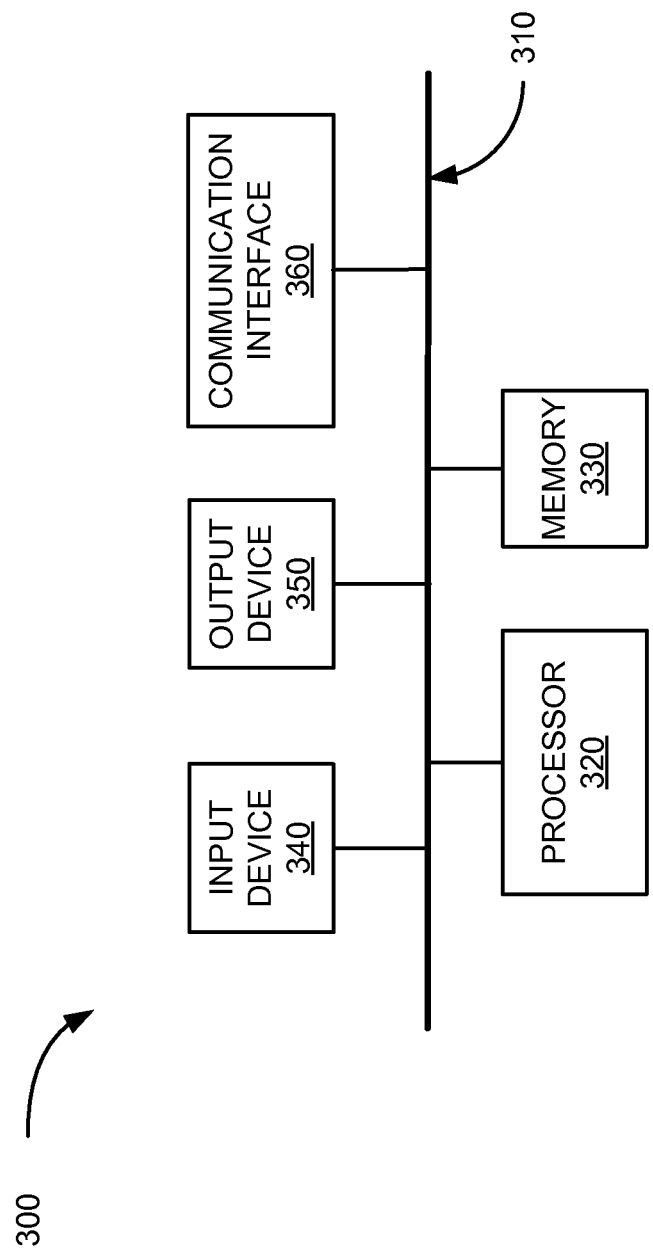
FIG. 3 is a diagram of an example client or server of the example network of FIG. 2.

FIG. 3 is a diagram of example components of a device 300, which may correspond to one or more of clients 210 and/or servers 220-240. In one implementation, device 300 may also correspond to one or more devices described below in connection with FIG. 4. Device 300 may include a bus 310, a processor 320, a memory 330, an input device 340, an output device 350, and a communication interface 360.

Bus 310 may include a path that permits communication among the components of device 300. Processor 320 may include a processor, a microprocessor, or processing logic (e.g., an application specific integrated circuit (ASIC) or a field programmable gate array (FPGA)) that interprets and executes instructions. Memory 330 may include a random access memory (RAM) device or another type of dynamic storage device that stores information and instructions for execution by processor 320, a read only memory (ROM) device or another type of static storage device that stores static information and instructions for use by processor 320, a magnetic and/or optical recording memory device and its corresponding drive, and/or a removable form of memory, such as a flash memory.

Input device 340 may include a mechanism that permits an operator to input information to device 300, such as a keyboard, a mouse, a button, a pen, a touch screen, voice recognition and/or biometric mechanisms, etc. Output device 350 may include a mechanism that outputs information to the operator, including a display, a light emitting diode (LED), a speaker, etc. Communication interface 360 may include any transceiver-like mechanism that enables device 300 to communicate with other devices and/or systems. For example, communication interface 360 may include mechanisms for communicating with another device or system via a network, such as network 260. For example, communication interface 360 may include a modem, a network interface card, or a wireless interface card.

As will be described in detail below, device 300 may perform certain operations relating to providing personalized ranks of popular topics. Device 300 may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Example System for Generating Personalized Hot Topic Rankings

Figure 4:
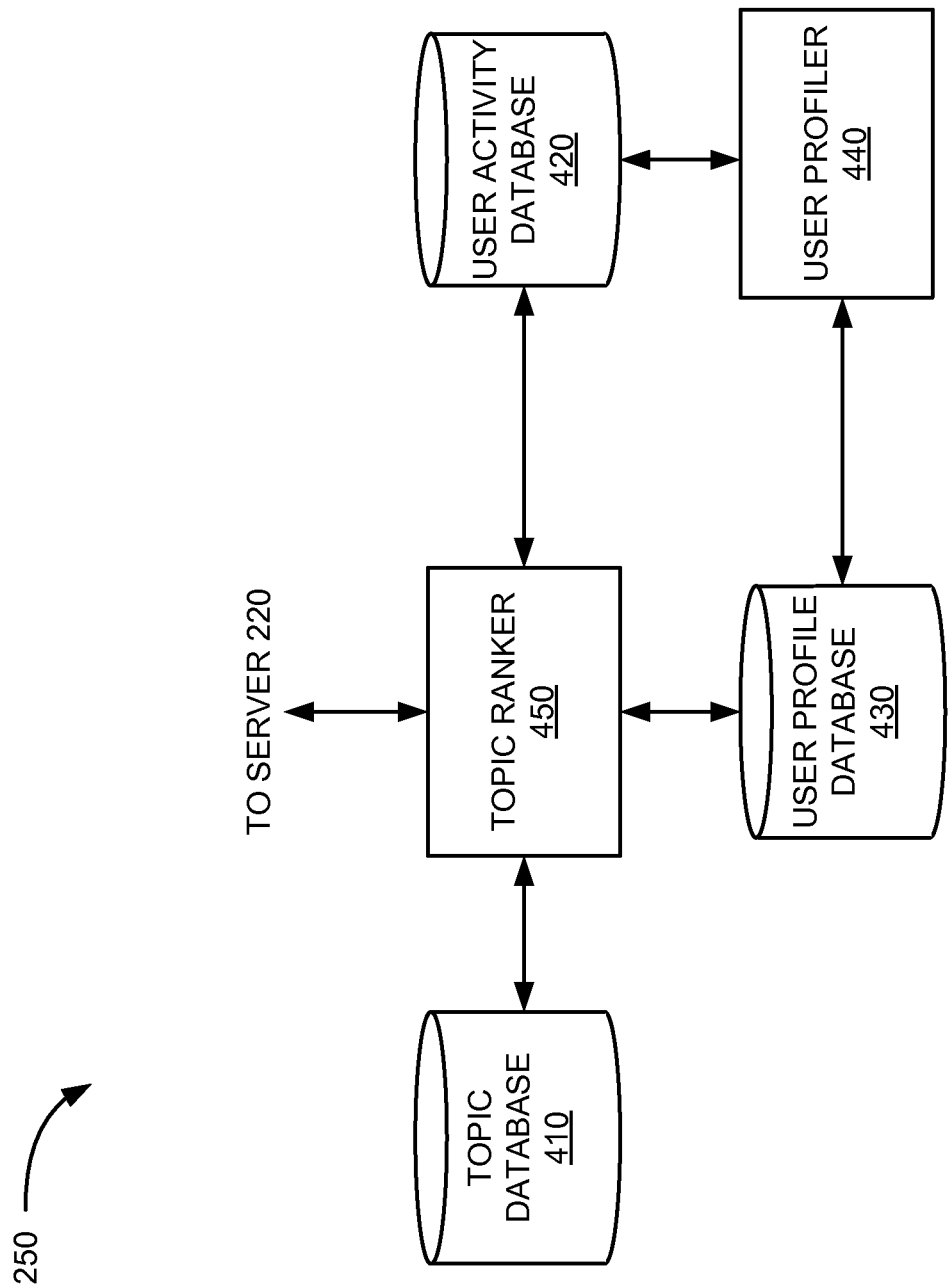
FIG. 4 is a diagram of example components of the popular topic ranking system of FIG. 2.

FIG. 4 is a diagram of example components of popular topic ranking system 250. Popular topic ranking system 250 may include a topic database 410, a user activity database 420, a user profile database 430, a user profiler 440, and a topic ranker 450. Each of topic database 410, user activity database 420, user profile database 430, user profiler 440, and topic ranker 450 may include one or more devices 300. The term "database," as used herein, may generally refer to any kind of data repository and/or any form or arrangement of data.

Topic database 410 may store information about topics related to search queries. For example, topic database 410 may store information associated with trending topics, along with item metadata such as language, popularity, spike (e.g., a rapid increase in topic activity), geographic region, and/or time of popularity. In one implementation, topic database 410 may be populated by search engine 225 based on certain search terms appearing in queries (e.g., from users of client devices 210) over time. A particular set of search terms may increasingly appear in queries over a period of time. For example, terms relating to a popular topic that is gaining/has gained popularity or a breaking news event would conceivably appear frequently over a period of time. In one implementation, topic database 410 may be queried to provide currently trending topics (e.g., popular topics) ordered by a generic, non-personalized, ranking score based on, for example, the popularity, spike, and/or a geographic region. In another implementation, topic database 410 may be queried to provide popular topics for a previous time window. In still another implementation, the window duration, for either a current window or a previous time window, may be a value configured by the user and included within a query.

User activity database 420 may store information about user activities, such as recent search queries that the user has submitted, documents selected or created by the user, and/or impressions associated with the user. In one implementation, the user's express content is required to populate user activity database 420. For example, the user may be presented with the option of recording, or not recording, the user's activities. As used herein, "impressions" may refer to a set of results presented to the user on a search results page. In one implementation, user activity database 420 may be populated by search engine 225 based on the user interactions with, for example, server 220. In another implementation, a browser extension (e.g., a toolbar) on client 210 may also provide information to user activity database 420. In one implementation, user activity database 420 may include search queries entered by the user. In another implementation, user activity database 420 may include keywords based on analyzing a series of search queries submitted by the user. For example, assume the user has entered the following search queries: "cheap airline tickets," "luggage sale," and "hotel reviews." Based on the entered search queries, user activity database 420 may store a "travel" keyword. In other implementations, user activity database 420 may also include information based on search results selected by a user, bookmarked documents, documents created by the user (e.g., blog posts, comments, emails, etc.), document received by the user (e.g., emails, etc.) and/or web pages visited by the user.

User profile database 430 may store information about users. For example, user profile database 430 may store information, associated with users, that may be used to calculate personalized scores for generically scored popular topics. In one implementation, user profile database 430 may store interests of a user derived (e.g., by user profiler 440) from user activity database 420. As with user activity database 420, a user's express consent may be required to populate user profile database 430 with data. Entries for user profile database 430 may include, for example, a user identification field, a language field, a location field, and/or an interests field. The user identification field may include information that identifies a particular user, such as a name of a user, a user login name, or a specific identification string that identifies the particular user. To protect the user's privacy, the user identification field may be stored anonymously. For example, rather than storing a user name, user profile database 430 may store a hash value derived from the user name. The language identification field may include languages which have been identified as acceptable to the user. The location field may include information about a geographic location of the user, such as a street address, a city, a state, a zip code, and/or a country provided in a user profile. In another implementation, the location field may be automatically populated based on, for example, an IP address associated with the user, an HTML5 Geolocation API, nearby WiFi networks, the user's location within a cellular network, GPS signals, or other mechanisms.

The interests field of user profile database 430 may include information about the interests of the user. In an implementation, the information about the interests may be in the form of keywords. Additionally, or alternatively, the information about the interests may be in the form of category codes for a particular category classification scheme, such as the Open Directory Project. Furthermore, the information about the interests of the user may be represented as a list of entities from an entity graph, such as Freebase.

In one implementation, the user may expressly provide the information about the user's interests when creating the user profile or by marking particular documents (e.g., as "liked" or "disliked"). In another implementation, the information about the user's interests may be automatically determined based on documents that the user has accessed (e.g., as recorded in user activity database 420) or other machine learning techniques. For example, documents that the user has accessed may be analyzed, with the user's permission, for topics by searching for noun phrases or noting any tags associated with the documents. As another example, search queries and/or user selections (e.g., "clicks") of particular search results may provide indications of user interest. In still another implementation, the information about the user's interests may be expressed as a negative interest (e.g., "not"

an interest). For example, unwanted words in a search query or an expressed dislike in a social networking application may be indications of a negative interest. Information in the interests field may be represented as a list of bags of words (e.g., unordered collections of words), keywords, topic clusters, and/or categories.

In other implementations, entries in user profile database 430 may include more or fewer fields. For example, user profile database 430 may also include information from bookmarks, emails, blogs, RSS (Really Simple Syndication) subscriptions, alerts, documents, or other information services that may indicate user interests.

User profiler 440 may create and maintain user profiles stored in user profile database 430. For example, user profiler 440 may populate user profile database 430 using data from user activity database 420, geographic data, and/or other external sources (such as bookmarks, emails, blogs, RSS subscriptions, alerts, documents, etc.). In one implementation, a user's express consent may be required before user profiler 440 may create and store a user profile in user profile database 430. For example, user profiler 440 may provide an option, to a particular user, to create a user profile when the particular user performs a certain action, such as accessing a particular web site or installing a toolbar. When creating the user profile, user profiler 440 may present, to a user, an option to enter information for fields stored within the user profile. In another implementation, user profiler 440 may gather information for at least some of the fields of a user's profile without explicitly presenting an option to the user to enter information. When a user profile is generated without presenting an option to the user to enter information, the information may be obtained based on user activity.

Topic ranker 450 may apply personalization scores to topics retrieved from topic database 410. Generally, for each request from a user, topic ranker 450 may retrieve a current list of popular topics from topic database 410 and apply personalization scores to the retrieved topics based on information from user activity database 420 and user profile database 430. Request from a user may be triggered explicitly (e.g., when a user of client 210 expressly selects/clicks on a link for popular topics) or implicitly (e.g., when popular topics are included in a home page or as part of a response to a general search query from a user). In an implementation, topic ranker 450 may apply personalization scores to popular topics for any given time window. The time window can be a period of time immediately preceding a current time or another period of time identified by the user. Topic ranker 450 is discussed further below in connection with, for example, FIG. 5.

Although FIG. 4 shows example components of popular topic ranking system 250, in other implementations, popular topic ranking system 250 may include fewer components, different components, additional components, or differently arranged components than depicted in FIG. 4. Additionally, or alternatively, one or more components of popular topic ranking system 250 may perform one or more tasks described as being performed by one or more other components of popular topic ranking system 250.

Figure 5:
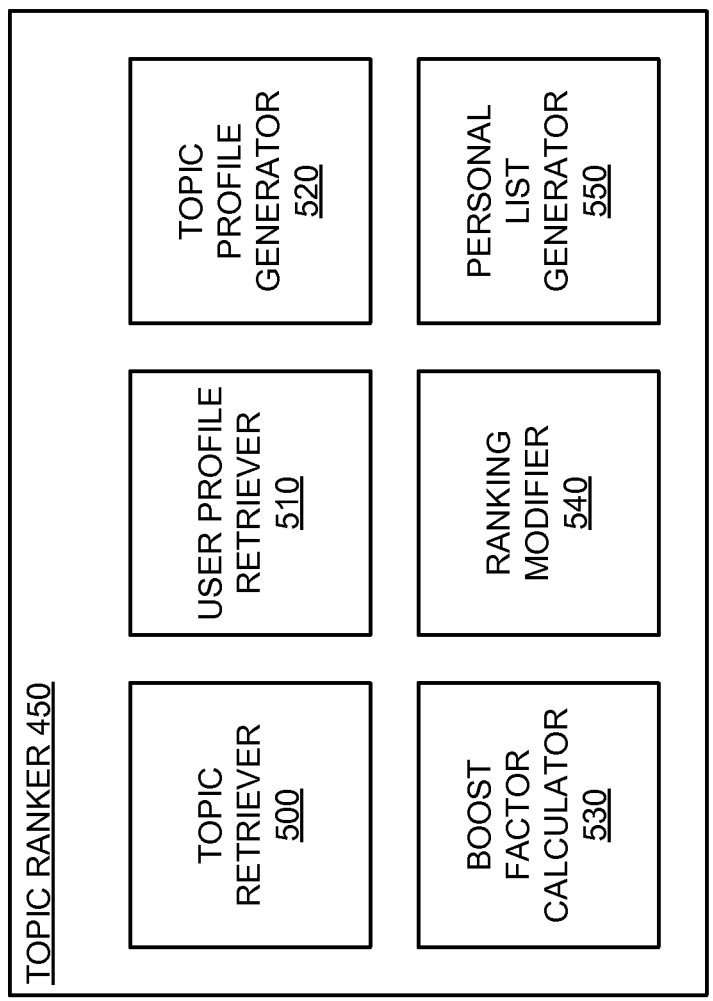
FIG. 5 is a diagram of example functional components of the topic ranker of FIG. 4.

FIG. 5 is a diagram of example functional components of topic ranker 450. According to one implementation, one or more of the functional components of topic ranker 450, described below, may be implemented by processor 320 of FIG. 3. As shown in FIG. 5, topic ranker 450 may include a topic retriever 500, a user profile retriever 510, a topic profile generator 520, a boost factor calculator 530, a ranking modifier 540, and a personal list generator 550.

Topic retriever 500 may retrieve a list of popular topics in response to a user request. In one implementation, for each user request (e.g., received from client 210), topic retriever 500 may query topic database 410, to retrieve a list of current popular topics. The popular topics may be ranked by a generic, non-personalized, score based, for example, on popularity, spike, and/or geographic region.

User profile retriever 510 may retrieve a user profile for a user associated with a request from client 210 from user profile database 430. The user profile may be identified, for example, based on a name of the user, a user login name, a specific identification string, an IP address, a browser cookie, etc. associated with the user request, or based on a suitably anonymyzed version of any of the foregoing, such as a hash value of a user name. Thus, user profiles may be obtained for both users with user accounts (e.g., associated with a provider of search engine 225) and/or users without user accounts (e.g., users that are not personally identifiable). In one implementation, the user profile may be computed offline (e.g., prior to a query from the user) using user profiler 440. In another implementation, at least part of the user profile can also be computed/updated in real time (e.g., during the processing time for responding to the user request).

Topic profile generator 520 may generate a topic profile for each popular topic in the list of popular topics retrieved by topic retriever 500. A topic profile may include categories, subcategories, and/or other component fields that may be associated with a particular topic and that may potentially correspond to component fields of a user profile. In one implementation, the topic profile may include a similar format to the user profile format to facilitate comparisons. Thus, a topic profile may include a bag of words, keywords, topic clusters, and/or categories. Topic profile generator 520 may profile the current popular topics in order to calculate a personalization score using the user profile. In one implementation, a topic profile for each popular topic may be computed, in response to the user's request, based on the subject matter of the popular topic itself and any available metadata about the popular topic, using a text categorization system. Additionally, or alternatively, topic profile generator 520 may use an additional cache component so that previously computed topic profiles can be directly retrieved from a data cache, such as a memory, thereby reducing the processing time needed to respond to a user request.

Boost factor calculator 530 may generate a personalization score for each popular topic in the list of popular topics retrieved by topic retriever 500. The personalization score may be used as a boost factor to alter the generic score for each topic in the list of popular topics retrieved from topic database 410. There are various techniques that boost factor calculator 530 may use to generate the personalization score.

In an implementation herein, boost factor calculator 530 may use a similarity detection technique to generate the personalization score. For example, both the user profile and the topic profile can be represented as a vector whose components indicate the user's interest in particular categories of subject matter or the topic's relevance to those categories of subject matter. For example, the user's profile can have 4 components representing the user's relative interest in learning about topics pertaining to politics, literature, science and sports. Of course fewer, more, or different categories of subject matter can be used to define the user and topic profiles. A user's interest in a particular category of subject matter can be expressed on a scale of 0 to 1, where 0 represents no interest and 1 represents the most interest. For example, a user's profile can be represented by the User_Profile vector (1.0, 0.5, 0.2, 0), while the topic profile for a particular topic can be represented by the Topic_Profile vector (0, 1.0, 0.5, 0.2). In such case, the boost factor may be computed as follows:

boost_factor=1+transformation(similarity(User_Profile,Topic_Profile)), where the similarity function can be any vector similarity function, such as the cosine similarity function, Jaccard similarity function, or simply the intersection size of two vectors (e.g., the number of intersecting elements or non-zero components the two vectors have in common), which output a non-negative score. The transformation function may be a deterministic mathematical function to be applied to the similarity score, so that the output can be scaled to a range meaningful for re-ranking the generic popular topics list. For illustration, let the similarity function be the set intersection function (e.g., intersect(User_Profile, Topic_Profile)), and let the transformation function be ln(similarity score+1). The boost factor for the aforementioned example would be 1+ln(2+1)=1+1.10=2.10.

In another implementation, the calculation above may be extended to compute a separate boost factor for each profile type, therefore multiple boost factors for each identified topic may be calculated. An additional combination function may be used to compute the final boost factor using all of the boost factors for each profile type. In another implementation, boost factor calculator 530 may identify a word overlap between trending queries and a user's search history to determine a boost factor. In still another implementation, boost factor calculator 530 may also account for negative interests of a user (e.g., as included in user profile database 430), such that a boost factor could include negative values. In other implementations, boost factor calculator 530 may use a different technique, or a combination of techniques, to identify a personalization score for each topic in the list of popular topics retrieved by topic retriever 500.

Boost factor calculator 530 may determine a boost factor for each popular topic in response to a user request (e.g., during processing time for responding to the user request). Alternatively, boost factor calculator 530 may determine boost factors offline for each popular topic and one or more user profiles in advance of a request.

Ranking modifier 540 may assign a new ranking score, based on the boost factor, to each topic from the generic popular topic list and re-rank the topics to provide a personalized popular topic list. For example, each time boost factor calculator 530 calculates a boost factor for a topic, ranking modifier 540 may generate a personalized ranking score by combining the generic ranking score and the boost factor for the topic. In one implementation, once ranking modifier 540 has finished computing personalized ranking scores for all topics from the list of popular topics, ranking modifier 540 may sort all of the topics according to the personalized ranking scores to provide a personalized list of popular topics for the user. In another implementation, ranking modifier 540 may fluidly adjust the rank of each topic as each of the new ranking scores is calculated.

Personal list generator 550 may identify particular topics to present to a user based on the personalized list of popular topics for the user. In one implementation, personal list generator 550 may choose a particular number (e.g., 5 or 10) of the highest ranked topics to present to the user. Alternatively, or additionally, personal list generator 550 may select topics having a new personalized ranking score (e.g., determined by ranking modifier 540) that achieves a minimum threshold score. For example, personal list generator 550 may be limited to a list of ten topics for the personalized list of popular topics, but may select fewer than ten topics if there are not ten topics with new personalized ranking scores that achieved a minimum threshold score. The minimum threshold score can be tailored to a particular user and stored as user profile data.

Although FIG. 5 shows example functional components of topic ranker 450, in other implementations, topic ranker 450 may include fewer functional components, different functional components, additional functional components, or differently functional arranged components than depicted in FIG. 5. Additionally, or alternatively, one or more functional components of topic ranker 450 may perform one or more tasks described as being performed by one or more other functional components of topic ranker 450.

Example Processes

FIG. 6 is a flowchart of an example process for providing personalized popular topic rankings according to an implementation described herein. In one implementation, the process of FIG. 6 may be performed by topic ranker 450. In other implementations, some or all of the process of FIG. 6 may be performed by another component or a group of components separate from or including topic ranker 450.

As shown in FIG. 6, process 600 may include receiving a popular topic request from a client (block 610) and identifying a list of popular topics based on generic ranking scores (block 620). For example, as described above in connection with FIG. 5, topic retriever 500 may retrieve a list of popular topics in response to a user query. In one implementation, for each user request (e.g., received from client 210), topic retriever 500 may query topic database 410, to retrieve a list of current popular topics. The popular topics may be ranked by a generic, non-personalized, score based, for example, on popularity, a spike, and/or geographic region.

Process 600 may include, identifying a user profile associated with the client (block 630). For example, as described above in connection with FIG. 5, user profile retriever 510 may retrieve a user profile (e.g., for a user associated with a request from client 210) from user profile database 430. The user profile may be identified, for example, based on a name of the user, a user login name, a specific identification string, etc. associated with the user request. The user's name, etc., may be suitably anonymized to protect the user's privacy. In one implementation, the user profile may be computed offline (e.g., prior to a query from the user) using user profiler 440. In another implementation, at least part of the user profile can be computed/updated in real time.

Process 600 may include generating a profile for a first/next topic from the popular topic list (block 640). For example, as described above in connection with FIG. 5, topic profile generator 520 may generate a topic profile for each popular topic (or set of topics) in the list of popular topics retrieved by topic retriever 500. Topic profile generator 520 may profile the current popular topics in order to apply personalization using the user profile. In one implementation, a profile for each popular topic may be computed, in response to the user's request, based on the subject matter content of the popular topic itself and any available metadata about the popular topic, using a text categorization system. Additionally, or alternatively, a cache component can retrieve previously computed and cached topic profiles from a data cache such as a memory.

Process 600 may include determining one or more boost factors for the topic (block 650). For example, as described above in connection with FIG. 5, boost factor calculator 530 may generate a personalization score for each popular topic in the list of popular topics retrieved by topic retriever 500. The personalization score may be used as a boost factor to alter the generic score for each topic (or set of topics) in the list of popular topics retrieved from topic database 410. Boost factor calculator 530 may use various techniques to calculate the boost factor, including, for example, a similarity detection technique.

Process 600 may include assigning a new ranking score to the topic based on the generic ranking score and the one or more boost factors (block 660) and determining if more topics are available to be scored (block 670). If more topics are available to be scored (block 670—YES), process 600 may return to block 640 to identify a profile for the next topic from the popular topic list. If no more topics are available to be scored (block 670—NO), the list of popular topics may be ordered according to the new ranking scores (block 680). For example, as described above in connection with FIG. 5, ranking modifier 540 may assign a new ranking score, based on the boost factor, to each topic from the generic popular topic list and re-rank the topics to provide a personalized popular topic list. Each time boost factor calculator 530 calculates a boost factor for a topic, ranking modifier 540 may associate the boost factor with the corresponding generic ranking score for that topic. Ranking modifier 540 may then calculate a personalized ranking score from the generic ranking score and the one or more boost factors for the topic. In one implementation, once ranking modifier 540 has finished computing new (e.g., personalized) ranking scores for all topics from the list of popular topics, ranking modifier 540 may sort all of the topics according to the adjusted ranking scores to provide a personalized list of popular topics for the user.

Example

Figure 7B:
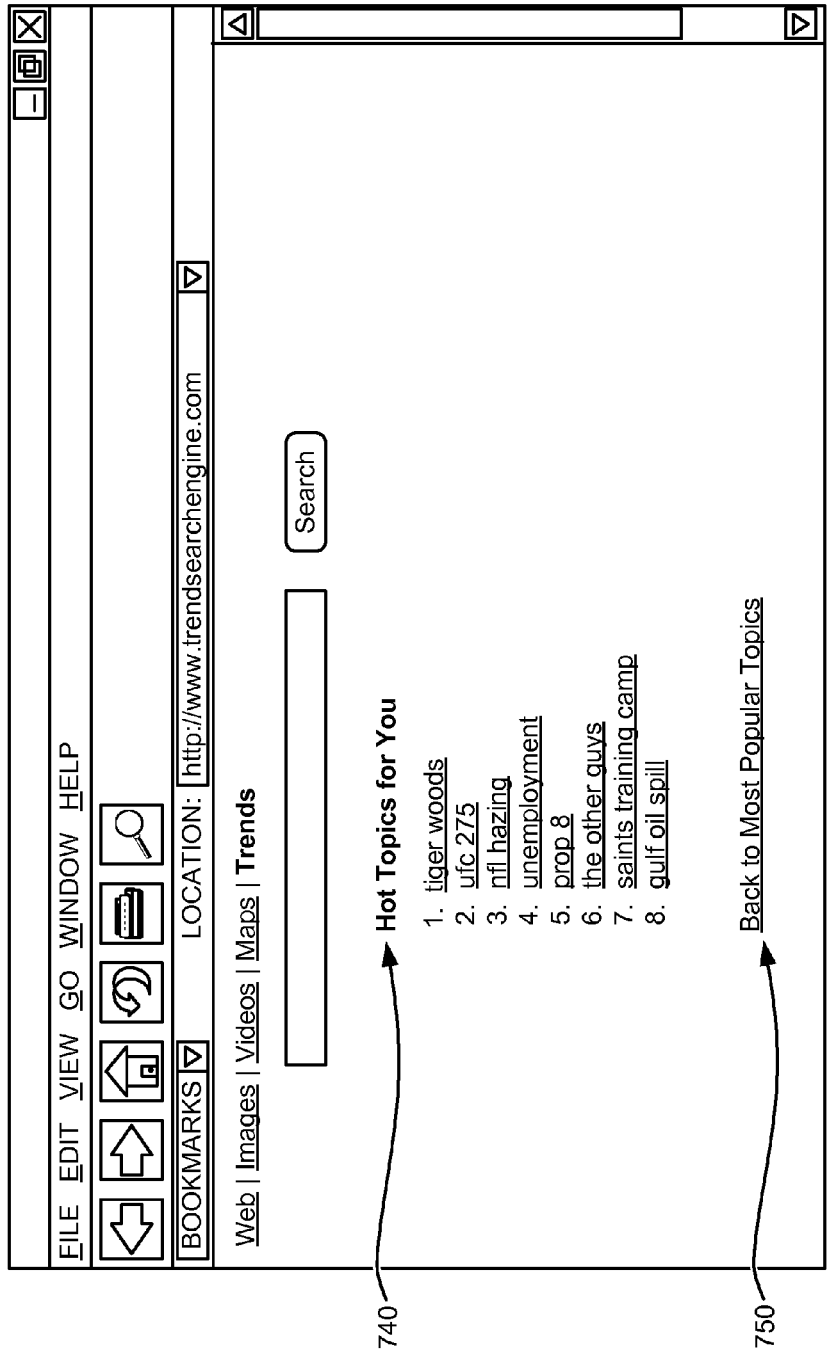

FIGS. 7A and 7B provide an example of a user interface for presenting personalized popular topics according to an implementation described herein. In one implementation, user interface screens 700 (of FIG. 7A) and 730 (of FIG. 7B) may be provided by web server 220 for presentation on a display of client 210. In another implementation, user interface screen 700 (of FIG. 7A) may be generated by web server 220 and user interface screen 730 (of FIG. 7B) may be generated by client 210 (e.g., in conjunction with web server 220).

As shown in FIG. 7A, user interface screen 700 may include a list of popular topics 710 (e.g., "Most Popular Topics") based on generic ranking criteria and an option (e.g., link 720) to view a list of personalized popular topics (e.g., "See Hot Topics for You"). List of popular topics 710 may include a generic ranking of popular topics (e.g., "1. unemployment, 2. ufc 275, . . . 10. waters ethics trial") based, for example, on statistics accumulated by a search engine (e.g., search engine 225) and stored in a popular topics database (e.g., topics database 410). In one implementation, user interface screen 700 may be presented as part of a default page, landing page, and/or home page (e.g., for user that are not logged in or that do not have an account). Each popular topic in the list of popular topics 710 may include a link to search results associated with the particular topic. Selection of a particular topic from the list of popular topics 710 may cause a search to be performed relating to the particular topic, and user interface 700 to present the appropriate search results (not shown).

Selection of link 720 to view a list of personalized popular topics may cause client 210 to present (e.g., after a login procedure, if necessary), a personalized popular topics list, as shown in user interface 730 of FIG. 7B. As described above, topic ranker 450 may retrieve a topic profile for each topic in a larger list of popular topics that includes list 710 and other lower ranked topics. Each topic profile may be compared against a user profile, for the user of client 210, to calculate a personalization score. For example, the generic popular topic "tiger woods" in list 710 may include a topic profile including highly scored components such as "golf," "pga," and "nike," among others. The user profile may include highly scored components for "tiger woods," "golf," and "pga." Based on these similarities, a high personalization score may be applied to the generic popular topic "tiger woods" in list 710. The personalization score may be normalized and added to the generic ranking score, used for "tiger woods" in list 710, to generate a revised ranking score. The ranking system may similarly generate revised ranking scores for other topics in the larger list of popular topics that includes list 710. The revised ranking scores may be used to generate a list of personalized popular topics.

As shown in FIG. 7B, user interface 730 may include a list of personalized popular topics 740 (e.g., "Hot Topics for You") based on the revised ranking scores applied to the generic list of popular topics that includes list 710. List of personalized popular topics 740 may include a personalized ranking of popular topics (e.g., "1. tiger woods, 2. ufc 275, . . . 8. gulf oil spill") that may be generated by topic ranker 450 based on, for example, information retrieved from topics database 410, user activity database 420, and/or user profile database 430. In one implementation, user interface screen 730 may be presented as part of a default page, landing page, and/or home page (e.g., for a user with a recognized account). User interface screen 730 may also include an option (e.g., link 750) to return to user interface screen 700 (e.g., "Back to Most Popular Topics").

While list of popular topics 710 and list of personalized popular topics 740 may be presented as a limited number of entries (e.g., five or ten topics), many more topics may be included in the scoring and/or ranking of the topics for list of popular topics 710 and list of personalized popular topics 740. As shown in the example of FIGS. 7A and 7B, boost factors applied to generic popular topics (e.g., from topics database 410) may cause some or all of the generically ranked topics from list of popular topics 710 to drop out of the top topics in the list of personalized popular topics 740. Thus, topics displayed in list of popular topics 710 may not be displayed in list of personalized popular topics 740, and vice versa. Particularly, entries such as "afghan medical mission" and "waters ethics trial" in list of popular topics 710 are not shown in list of personalized popular topics 740, while entries such as "saints training camp" in list of personalized popular topics 740 are not shown in list of popular topics 710. In still another implementation, only topics that achieve a particular threshold score (or achieve a particular score deviation above other ranked topics) may be shown in list of personalized popular topics 740. Thus, the particular number of topics displayed in list of personalized popular topics 740 may differ from one presentation to another.

While FIGS. 7A and 7B provide an example user interface for providing personalized popular topics to a user, in other implementations, the user interface may include different information, additional information, or differently arranged information than depicted in FIGS. 7A and 7B. For example, while FIGS. 7A and 7B present user interface screens in the context of a full-sized computer display, in other implementations, another interface, such as a mobile user interface, an interactive television interface, etc. may be used.

FIG. 8 provides another example of a user interface for presenting personalized popular topics according to an implementation described herein. In one implementation, user interface screen 800 may be provided by web server 220 for presentation on a display of client 210. In another implementation, user interface screen 800 may be generated by client 210 in conjunction with web server 220.

As shown in FIG. 8, user interface screen 800 may include a home page 810 (e.g., for a search engine) and a personalized topics section 820. Home page 810 may include, for example, features associated with receiving and/or soliciting search queries from a user. Personalized topics section 820 may include a list of personalized popular topics (e.g., "Hot Topics for You") based on information from a combination of generic ranking criteria, user activity data, and user profile data. The list of personalized popular topics may include a personalized ranking of popular topics (e.g., "wall street regulations, wall street recovers, obama wall street") that may be generated by topic ranker 410 based on, for example, information retrieved from topics database 410, user activity database 420, and/or user profile database 430.

In one implementation, personalized topics section 820 may be presented in home page 810 only when scores from topic ranker 410 reach a particular threshold. Also, only topics that reach the particular threshold may be presented in personalized topics section 820. Personalized topics section 820 may not be presented in home page 810 if no topics achieve scores from topic ranker 410 that reach the particular threshold. For example, using thresholds for personalized topics section 820, a user might not see personalized topics section 820 on some days, and might see only a few hot topics in personalized topics section 820 when personalized topics section 820 is presented within home page 810.

While FIG. 8 provides an example user interface for providing personalized popular topics to a user, in other implementations, the user interface may include different information, additional information, or differently arranged information than depicted in FIG. 8.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while an implementation of the systems and/or methods described herein has been described in the context of personalizing lists of popular topics, other implementations of the systems and/or methods described herein may be applied with respect to personalization of other search engine statistics and/or documents and/or lists. Other implementations may include, for example, applications for personalized alert recommendations, personalized search suggestions for news/blogs segments, and social bookmarks. Also, while certain user profile processing has been described as being performed in advance of receiving a user request, in other implementations, all user profiling may be done during request processing time (e.g., after receiving the user request).

Also, while a series of blocks has been described with regard to FIG. 6, the order of the blocks may be modified in other implementations. Further, non-dependent blocks may be performed in parallel.

Furthermore, certain portions of the implementations may have been described as "logic" or a "component" that performs one or more functions. The terms "logic" or "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by one or more server devices of a topic ranking system, a user request;
obtaining, by the one or more server devices, a list of popular topics, a ranking score for each topic in the list of popular topics, and a topic profile for a particular topic in the list of popular topics;
identifying, by the one or more server devices, a user profile for a user associated with the user request;
determining, by the one or more server devices, a personalization score for the particular topic in the list of popular topics, where the personalization score for the particular topic is based on one or more similarities between the user profile and the topic profile for the particular topic, determining the personalization score further comprising:
representing the user profile as a first component that represents the user's interest in different subject matter categories,
representing the topic profile as a second component that represents a relevance of the particular topic to the different subject matter categories,
applying a vector similarity function to the first component and the second component to compute a similarity score for the first component and the second component,
applying a transformation function to the similarity score computed based on applying the vector similarity function to the first component and the second component; and
determining, as a boost factor, a numeric value for the personalization score based on a result of applying the transformation function to the similarity score;
determining, by the one or more server devices, a revised ranking score for the particular topic in the list of popular topics based on the personalization score and the ranking score for the particular topic; and ranking, by the one or more server devices, the topics, in the list of popular topics, using the revised ranking score for the particular topic.

2. The method of claim 1, where the user profile includes one or more of:
   information regarding an interest of the user,
   information regarding documents that the user has accessed, or
   information regarding one or more services associated with the user.

3. The method of claim 1, where the user profile includes one or more of:
   words associated with an interest of the user,
   information regarding a topic cluster associated with an interest of the user,
   information regarding a geographic location associated with the user, or
   information regarding a category associated with an interest of the user.

4. The method of claim 1, further comprising:
   generating the topic profile for the particular topic.

5. The method of claim 4, where generating the topic profile for the particular topic includes:
   using a text categorization system to identify subject matter categories based on one or more of:
      subject matter of the particular topic, or
      metadata associated with the particular topic.

6. The method of claim 1, where the vector similarity function includes one or more of:
   a cosine similarity function,
   a Jaccard similarity function, or
   a number of non-zero subject matter categories shared by the user profile and the topic profile.

7. The method of claim 1, further comprising:
   receiving information identifying a time window indicating a period of time for which a list of popular topics is desired; and
   using the time window to constrain the list of popular topics to topics that were popular during the indicated period of time.

8. The method of claim 1, where the user request is a request for popular topics.

9. The method of claim 1, where the user request is a search request.

10. A server device, of a topic ranking system, comprising:
    a memory to store:
       a user profile data structure that includes information about multiple users, and
       a topic data structure that includes topics, where each topic is assigned a popularity score; and
    a processor to execute instructions to:
       receive a request from a client device associated with a user,
       obtain, from the topic data structure, a list of popular topics for a particular time period, a ranking score for each topic in the list of popular topics, and a topic profile for a particular topic in the list of popular topics,
       identify a user profile for the user,
       determine a personalization score for the particular topic in the list of popular topics, where the personalization score for the particular topic is based on one or more similarities between the user profile and the topic profile for the particular topic, the processor, when determining the personalization score, being further to:
          represent the user profile as a first component that represents the user's interest in different subject matter categories,
          represent the topic profile as a second component that represents a relevance of the particular topic to the different subject matter categories,
          apply a vector similarity function to the first component and the second component to compute a similarity score for the first component and the second component,
          apply a transformation function to the similarity score computed based on applying the vector similarity function to the first component and the second component, and
          provide, as a boost factor, a numeric value for the personalization score based on a result of applying the transformation function to the similarity score,
       determine a revised ranking score for the particular topic in the list of popular topics using the personalization score and the popularity score for the particular topic, and
       rank the topics, in the list of popular topics, using the revised ranking score for the particular topic.

11. The server device of claim 10, where the user profile includes one or more of:
    a personal identifier for the user,
    information regarding a language associated with the user,
    information regarding a geographic location associated with the user, or
    information regarding an interest associated with the user.

12. The server device of claim 11, where the interest associated with the user includes one or more of:
    words associated with a search history of the user,
    a keyword associated with a search history of the user,
    a topic cluster associated with a search history of the user, or
    a category associated with a search history of the user.

13. The server device of claim 10, where the processor is further to:
    generate the topic profile for the particular topic.

14. The server device of claim 10, where the topic profile for the particular topic includes one or more of:
    a category associated with the particular topic, or
    a category associated with metadata for the particular topic.

15. The server device of claim 10, where the processor is further to:
    generate the topic profile for each of the plurality of topics in the list of popular topics before receiving the request.

16. One or more memory devices comprising instructions executable by one or more processors of a topic ranking system, the one or more memory devices comprising:
    one or more instructions to obtain a list of popular topics, a ranking score for each topic in the list of popular topics, and a topic profile for a particular topic in the list of popular topics;
    one or more instructions to obtain a user profile that includes categories of topics associated with a user;
    one or more instructions to determine a personalization score for the particular topic in the list of popular topics, where the personalization score for the particular topic is based on one or more similarities between the user profile and the topic profile for the particular topic, the one or more instructions to determine the personalization score including:

one or more instructions to represent the user profile as a first component that represents the user's interest in different subject matter categories, one or more instructions to represent the topic profile as a second component that represents a relevance of the particular topic to the different subject matter categories, one or more instructions to apply a vector similarity function to the first component and the second component to compute a similarity score for the first component and the second component, one or more instructions to apply a transformation function to the similarity score computed based on applying the vector similarity function to the first component and the second component, and one or more instructions to provide, as a boost factor, a numeric value for the personalization score based on a result of applying the transformation function to the similarity score;

one or more instructions to assign a revised ranking score for the particular topic in the list of popular topics using the personalization score and the ranking score; and one or more instructions to rank the topics, in the list of popular topics, using the revised ranking score for the particular topic.

17. The one or more memory devices of claim 16, further comprising:

one or more instructions to receive, from a client device associated with the user, a request for a list of personalized popular topics; and one or more instructions to send, to the client device and based on the request, the list of popular topics using the revised ranking score for the particular topic.

18. The one or more memory devices of claim 16, further comprising:

one or more instructions to generate the topic profile for the particular topic, the one or more instructions to generate the topic profile for the particular topic including:

one or more instructions to use a text categorization system to identify subject matter categories based on one or more of:

a subject matter of the particular topic, or metadata associated with the particular topic.

19. The one or more memory devices of claim 16, further comprising:

one or more instructions to receive information identifying a time window indicating a period of time for which a list of popular topics is desired; and one or more instructions to use the time window to constrain the list of popular topics to topics that were popular during the indicated period of time.

20. The one or more memory devices of claim 16, where the user profile includes one or more of:

information regarding an interest of the user, information regarding documents that the user has accessed, or information regarding one or more services associated with the user.

* * * * *